United States Patent
Kwon

(10) Patent No.: US 11,104,196 B2
(45) Date of Patent: Aug. 31, 2021

(54) METHOD FOR MANUFACTURING HYBRID SUSPENSION ARM FOR VEHICLE USING FIXING PIN AND HYBRID SUSPENSION ARM MANUFACTURED BY USING SAME

(71) Applicant: ILJIN CO., LTD., Gyeongju-si (KR)

(72) Inventor: Tae Sung Kwon, Gyeongju-si (KR)

(73) Assignee: ILJIN CO., LTD., Gyeongju-si (KR)

( * ) Notice: Subject to any disclaimer, the term of this patent is extended or adjusted under 35 U.S.C. 154(b) by 0 days.

(21) Appl. No.: 16/834,222

(22) Filed: Mar. 30, 2020

(65) Prior Publication Data

US 2020/0223273 A1    Jul. 16, 2020

Related U.S. Application Data

(63) Continuation of application No. PCT/KR2018/011544, filed on Sep. 28, 2018.

(30) Foreign Application Priority Data

Sep. 29, 2017  (KR) .................. 10-2017-0127881

(51) Int. Cl.
  *B60G 7/00*  (2006.01)
  *B29C 45/14*  (2006.01)
  *B29L 31/30*  (2006.01)

(52) U.S. Cl.
  CPC ........ *B60G 7/005* (2013.01); *B29C 45/14754* (2013.01); *B60G 7/001* (2013.01);
  (Continued)

(58) Field of Classification Search
  CPC .... B60G 7/005; B60G 7/001; B60G 2204/41; B60G 2204/416; B60G 2206/12;
  (Continued)

(56) References Cited

U.S. PATENT DOCUMENTS 3,098,263 A * 7/1963 Campbell ......... B29C 45/14754
                                                        249/88
4,470,786 A * 9/1984 Sano ....................... B29C 33/14
                                                        257/E21.504
(Continued)

FOREIGN PATENT DOCUMENTS

EP    1310344 A1    5/2003
EP    3398795 A2   11/2018
(Continued)

OTHER PUBLICATIONS

International Search Report for PCT/KR2018/011544 dated Jan. 15, 2019.
(Continued)

*Primary Examiner* — Darlene P Condra
(74) *Attorney, Agent, or Firm* — Dinsmore & Shohl LLP; Yongsok Choi, Esq.

(57) ABSTRACT

The present disclosure relates to a method of manufacturing a vehicular hybrid suspension arm and a hybrid suspension arm manufactured using the same. The method of manufacturing a hybrid suspension arm includes preparing an assembly of a ball stud and a bearing; preparing a suspension arm body; attaching a ball joint pipe and bush pipes to the suspension arm body; manufacturing a suspension arm main body by inserting the assembly of the ball stud and the bearing into the ball joint pipe; inserting the suspension arm main body into a mold in which a plurality of fixing pins are formed; injecting an insert molding into a ball joint portion comprising the ball joint pipe and the ball stud in a direction of an upper surface of the ball joint pipe through the mold; and inserting and assembling bushes into the bush pipes.

15 Claims, 11 Drawing Sheets

(52) U.S. Cl.
CPC ....... *B29L 2031/30* (2013.01); *B60G 2204/41* (2013.01); *B60G 2204/416* (2013.01); *B60G 2206/12* (2013.01); *B60G 2206/124* (2013.01); *B60G 2206/81012* (2013.01)

(58) Field of Classification Search
CPC .... B60G 2206/124; B60G 2206/81012; B60G 2206/7101; B60G 2206/811; B60G 2206/013; B60G 2206/014; B60G 2204/418; B60G 2206/012; B60G 2206/72; B60G 2206/91; B29C 45/14754; B29C 45/14065; B29L 2031/30
See application file for complete search history.

(56) References Cited

U.S. PATENT DOCUMENTS

| | | | | |
|---|---|---|---|---|
| 4,865,793 A * | 9/1989 | Suzuki | .............. | B29C 45/14811 264/278 |
| 7,025,921 B2 * | 4/2006 | Ilse | .................. | B29C 45/14344 264/259 |
| 8,070,993 B2 * | 12/2011 | Keys | ................. | B29C 45/14073 264/40.4 |
| 2007/0138697 A1 * | 6/2007 | Takeda | .............. | B29C 45/14221 264/278 |
| 2010/0084834 A1 * | 4/2010 | Ersoy | .................... | B60G 7/001 280/124.1 |
| 2010/0244296 A1 | 9/2010 | Keys | | |
| 2012/0315414 A1 * | 12/2012 | Wesch | ................. | B62D 29/005 428/34.1 |
| 2019/0061452 A1 * | 2/2019 | Lee | ......................... | B29C 45/14 |
| 2019/0315173 A1 * | 10/2019 | Kim | ....................... | B60G 7/001 |
| 2020/0047243 A1 * | 2/2020 | Reikher | ................ | B22D 19/08 |
| 2020/0047575 A1 * | 2/2020 | Sarlin | ............... | B29C 45/14336 |

FOREIGN PATENT DOCUMENTS

| | | |
|---|---|---|
| JP | 3127764 B2 | 1/2001 |
| JP | 2001182739 A | 7/2001 |
| KR | 1020090122978 A | 12/2009 |
| KR | 101393849 B1 | 5/2014 |
| KR | 101747336 B1 | 6/2017 |
| KR | 1020170086372 A | 7/2017 |

OTHER PUBLICATIONS

Extended European Search Report for EP18860033.2 dated Mar. 29, 2021.

\* cited by examiner

METHOD FOR MANUFACTURING HYBRID SUSPENSION ARM FOR VEHICLE USING FIXING PIN AND HYBRID SUSPENSION ARM MANUFACTURED BY USING SAME

CROSS-REFERENCE TO RELATED APPLICATIONS

This application is continuation of International Application No. PCT/KR2018/011544 filed on Sep. 28, 2018, which claims priority to Korean Patent Application No. 10-2017-0127881 filed on Sep. 29, 2017, the entire contents of which are herein incorporated by reference.

TECHNICAL FIELD

The present disclosure generally relates to a hybrid suspension arm for a vehicle, which is made of composite material, and a method of manufacturing the same.

BACKGROUND ART

Generally, a suspension system of a vehicle is an apparatus for connecting a wheel to a vehicle body.

A vehicular suspension system comprises a spring for absorbing a vibration or an impact which is transferred from a road surface to a vehicle body, a shock absorber for adjusting an operation of the spring, and a suspension arm or a suspension link for controlling an operation of a wheel.

Meanwhile, a method of controlling an operation of a wheel may be classified into a swing arm type, a wishbone type, a MacPherson strut type, and the like. A suspension system using the wishbone type control method is provided with a suspension arm (a lower control arm) for connecting a knuckle engaged with a wheel to a vehicle body. That is, one end of the suspension arm is connected to a cross member or a sub-frame constituting a vehicle body, and the other end thereof is connected to a knuckle via a ball joint. With the above configuration, the suspension arm supports the wheel on the vehicle body and appropriately controls a toe-in of the wheel according to a driving condition of the vehicle, thereby improving straight drivability and steering stability of the vehicle.

In a conventional manufacturing method for a suspension arm, the suspension arm is manufactured by casting steel material or is manufactured by forming an upper plate and a lower plate by pressing steel material and then coupling the upper plate and the lower plate by welding. In this case, the suspension arm has problems that a weight is heavy due to a characteristic of steel material, a lot of manufacturing processes are required, and deformation and vulnerable rigidity may occur due to welding of steel plates. In order to solve the above problems of the suspension arm made of steel material and achieve weight reduction, a hybrid suspension arm made of composite material has been proposed and developed.

Generally, such a hybrid suspension arm is manufactured by forming a suspension arm body and then injecting plastic injection material on the suspension arm body through insert molding. However, since the plastic injection material is injected at a position adjacent to a ball joint portion, the above manufacturing method may have problems that bending deformation occurs in the ball joint portion due to an injection pressure and a short shot of the plastic injection material is caused. In order to solve the above problems, a method of adding a spike structure to an injection molding mold and firmly fixing the ball joint portion may be applied to prevent deformation of the ball joint portion due to an injection pressure. However, when the spike structure is added to the mold so as to prevent the bending deformation of the ball joint portion, the bending deformation can be prevented, but a painted surface of the portion in contact with the spike structure may be damaged due to a contact with the spike structure so that there may occur another problem that a metal portion of the suspension arm body is exposed to air and rust occurs thereon.

SUMMARY

Technical Problem

The present disclosure is directed to providing a method of manufacturing a vehicular hybrid suspension arm, which is capable of preventing bending deformation of a ball joint portion due to an injection pressure by fixing the ball joint portion of a hybrid suspension arm without adding a spike structure to a mold and solving a problem of rust occurrence due to damage of a painted surface of the portion in contact with the spike structure.

Further, the present disclosure is directed to providing a hybrid suspension arm manufactured using the above manufacturing method.

Technical Solution

The method of manufacturing a suspension arm for a vehicle according to one embodiment of the present disclosure may comprise preparing an assembly of a ball stud and a bearing; preparing a suspension arm body; attaching a ball joint pipe and bush pipes to the suspension arm body; manufacturing a suspension arm main body by inserting the assembly of the ball stud and the bearing into the ball joint pipe; inserting the suspension arm main body into a mold in which a plurality of fixing pins are formed; injecting an insert molding into a ball joint portion comprising the ball joint pipe and the ball stud through the mold and coupling a plastic insert molding to the suspension arm main body; and inserting and assembling the bushes into the bush pipes, wherein when the suspension arm main body is inserted into the mold, the plurality of fixing pins may be located adjacent to the ball joint portion to fix a lower surface of the ball joint pipe during injection of the insert molding.

In the method of manufacturing a hybrid suspension arm, two fixing pins may be formed in the mold.

In the method of manufacturing a hybrid suspension arm, in the inserting of the suspension arm main body into the mold, the plurality of fixing pins may be disposed on a symmetrical line of the suspension arm body.

In the method of manufacturing a hybrid suspension arm, the suspension arm body may be formed of metal material, and anti-corrosion painting may be applied to the suspension arm body.

In the method of manufacturing a hybrid suspension arm, the mold may comprise at least one injection hole formed at a position adjacent to the ball joint portion, and in the coupling of the plastic insert molding to the suspension arm body, the insert molding may be injected in direction of an upper surface of the ball joint pipe through the at least one injection hole.

The method of manufacturing a hybrid suspension arm may further comprise removing the mold from the suspension arm body coupled with the insert molding; and coupling a dust cover to the ball stud of the ball joint portion to block fixing pin contact portions, in which the fixing pins were in contact with the ball joint pipe, from the outside.

In the method of manufacturing a hybrid suspension arm, in the coupling of the plastic insert molding to the suspension arm body, the insert molding may be injected with an injection pressure that is greater than or equal to 300 bar.

In another embodiment of the present disclosure, a hybrid suspension arm may be manufactured by at least one of the above-described methods of manufacturing a hybrid suspension arm.

In another embodiment of the present disclosure, the method of manufacturing a suspension arm for a vehicle may comprise preparing an assembly of a ball stud and a bearing; preparing a suspension arm body; manufacturing a suspension arm main body by attaching bush pipes and a ball joint pipe having a plurality of fixing pins on a lower surface thereof to the suspension arm body and inserting the assembly of the ball stud and the bearing into the ball joint pipe; inserting the suspension arm main body into a mold; injecting an insert molding into a ball joint portion comprising the ball joint pipe and the ball stud through the mold and coupling a plastic insert molding to the suspension arm main body; cutting and removing a portion of the fixing pins; and inserting and assembling the bushes into the bush pipes, wherein the fixing pins may be in contact with the mold and fix the ball join portion during injection of the insert molding.

Advantageous Effects

According to various embodiments of the present disclosure, it is possible to prevent bending deformation of a ball joint portion due to an injection pressure during injection of an insert molding in a manufacturing process of a hybrid suspension arm.

Further, since it is not necessary in the present disclosure to form a spike structure to a mold so as to prevent the bending deformation of the ball joint portion, it is possible to prevent damage on a painted surface of the portion in contact with the spike structure, exposure of metal material to air due to such a damage, and rust occurrence due to the exposure of metal material.

Further, the portions in contact with fixing pins in the process of injecting the insert molding cannot be covered by the insert molding in the present disclosure, but these portions can be prevented from being exposed to the outside by mounting a dust cover to the ball joint portion.

DESCRIPTION OF DRAWINGS

The following drawings, which are incorporated herein, illustrate exemplary embodiments of the present disclosure and serve to provide a further understanding of the technical idea of the present disclosure together with the detailed descriptions of the present disclosure. Accordingly, it should be construed that the present disclosure is not limited to the features illustrated in the drawings.

DETAILED DESCRIPTION

Figure 1:
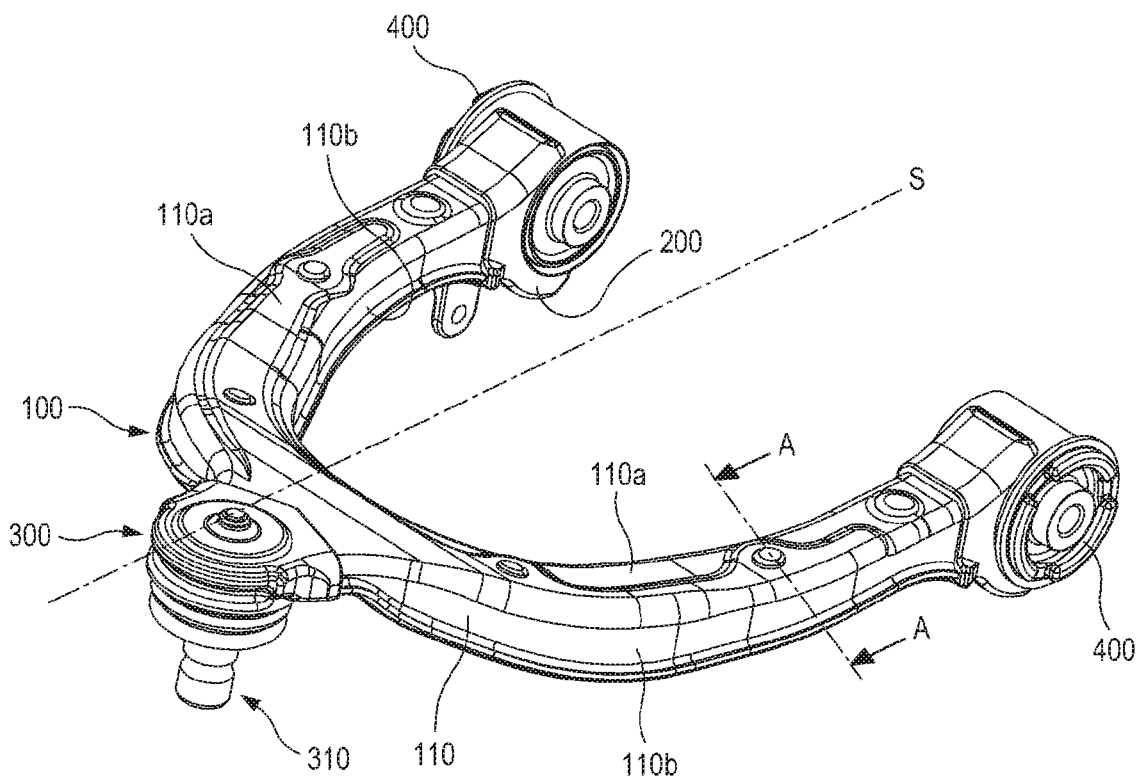
FIG. 1 is a perspective view illustrating a vehicular hybrid suspension arm manufactured by a manufacturing method according to one embodiment of the present disclosure.

Embodiments of the present disclosure are exemplified for the purpose of describing the technical spirit of the present disclosure. The scope of the claims according to the present disclosure is not limited to the embodiments described below or to the detailed descriptions on these embodiments.

Unless otherwise defined, all technical and scientific terms used herein have the same meaning commonly understood by those skilled in the art to which the present disclosure pertains. All terms used herein are selected for the purpose of more clearly describing the present disclosure and not limiting the scope of the present disclosure defined by appended claims.

Unless the phrase or sentence clearly indicates otherwise, terms "comprising," "including," "having," "taking," and the like used herein should be construed as open-ended terms encompassing the possibility of including other embodiments.

The singular form described herein may include the plural form unless the context clearly dictates otherwise, and this is equally applied to the singular form set forth in the claims.

Throughout the present disclosure, when a component is referred to as being "connected" or "coupled" to another component, the component can be directly connected or coupled to another component, or can be connected or coupled to another component by intervening yet another component therebetween.

In the present disclosure, when it is described as being "inserted," an insertion method may include, for example, a press-inserting method.

Hereinafter, embodiments of the present disclosure will be described with reference to the accompanying drawings. In the accompanying drawings, the same reference numerals are assigned to the same or corresponding components. Further, in the following descriptions of the embodiments, duplicate descriptions of the same or corresponding components may be omitted. However, even though a description of any component is omitted, such a component is not intended to be excluded in any embodiment.

Figure 2:
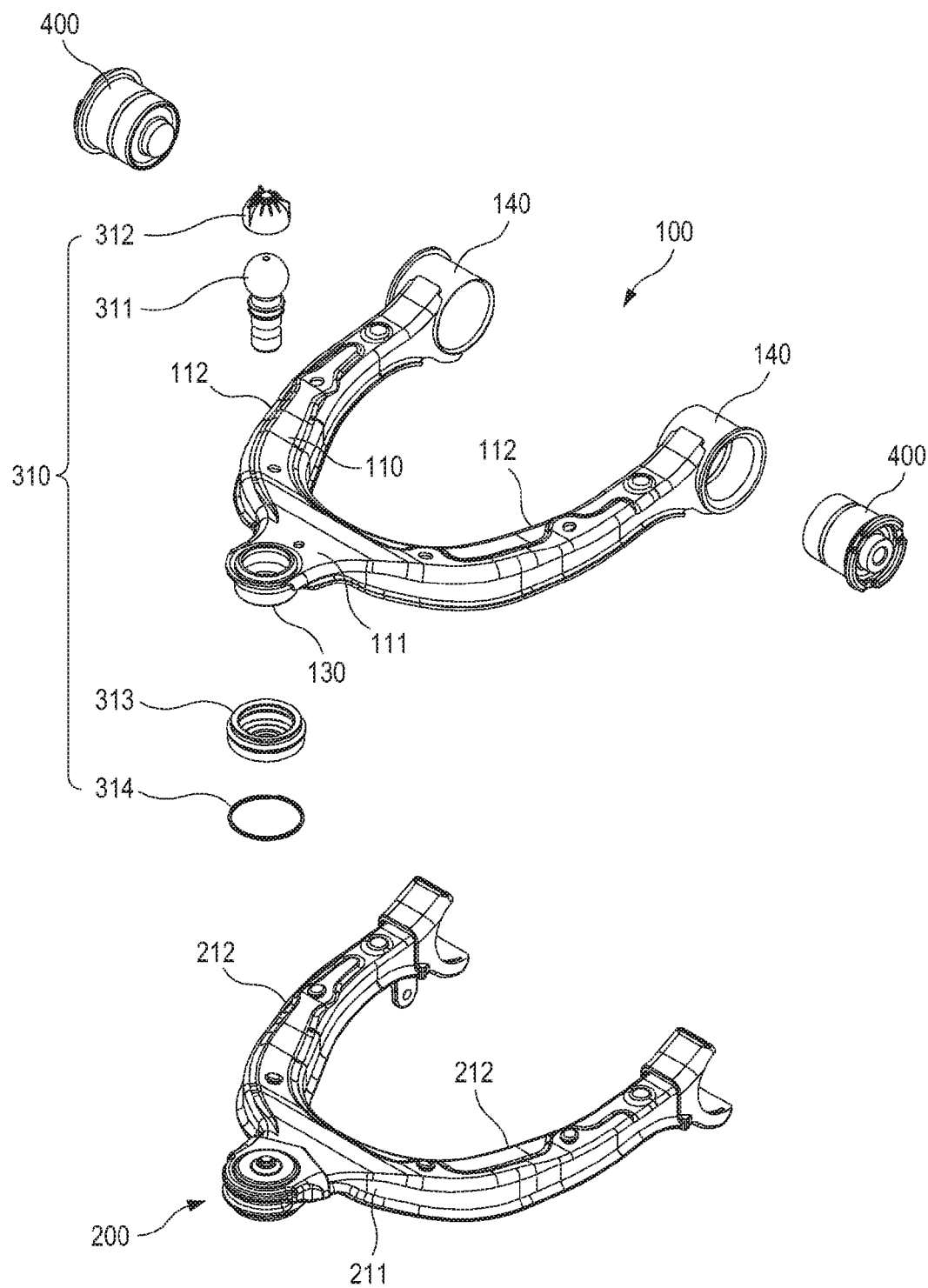
FIG. 2 is an exploded perspective view illustrating the vehicular hybrid suspension arm manufactured by the manufacturing method according to one embodiment of the present disclosure.

FIG. 1 is a perspective view illustrating a vehicular hybrid suspension arm 1000 manufactured by a manufacturing method according to one embodiment of the present disclosure, and FIG. 2 is an exploded perspective view illustrating the vehicular hybrid suspension arm 1000 of FIG. 1.

The vehicular hybrid suspension arm 1000 may comprise a suspension arm main body 100, and the suspension arm main body 100 may comprise a suspension arm body 110, a ball joint pipe 130, bush pipes 140, and a ball joint 310. The suspension arm body 110 may be manufacturing by pressing a high-tension steel plate for a vehicle. Further, the vehicular hybrid suspension arm 1000 may comprise a ball joint portion 300.

The suspension arm body 110 may be formed of metal material, and painting treatment may be performed on a surface thereof for preventing surface corrosion. Further, for example, the suspension arm body 110 may have a shape such as a 'U' shape. For example, the 'U'-shaped suspension arm body 110 may be used as an upper control arm of a suspension system, but the present disclosure is not limited thereto.

The suspension arm body 110 may comprise an upper portion 110a and two side portions 110b extending from the upper portion 110a.

The suspension arm body 110 may comprise two leg portions 112 and a joint portion 111 integrally connecting the two leg portions 112. The bush pipe 140 may be coupled to a front end portion of each of the two leg portions 112, and the ball joint pipe 130 may be coupled to a front end portion of the joint portion 111. In one embodiment, the bush pipes 140 and the ball joint pipe 130 may be coupled to each of the front end portions of leg portions 112 and the joint portion 111 by welding. Specifically, a semi-cylindrical coupling hole may be formed at the front end portions of each of the leg portions 112 and the front end portion of the joint portion 111, so that the ball joint pipe 130 and the bush pipes 140 may be fitted into the coupling holes and coupled thereto by welding. For example, a welding method may be electric welding, $CO_2$ welding, oxygen welding, argon welding, spot welding, and the like. However, the present disclosure is not limited to the above welding method. Alternatively, the bush pipes 140 and the ball joint pipe 130 may be coupled to the front end portions of the leg portions 112 and the front end portion of the joint portion 111 by another coupling method such as laser welding, ultrasonic, and the like, but the coupling method is not limited to the above method. The ball joint pipe 130 may be formed in a circular shape and may be coupled to an end portion of the joint portion 111 in a state in which a center point of the ball joint pipe 130 is put on a symmetrical line S.

An opening of the ball joint pipe 130 may be disposed in a vertical direction of the hybrid suspension arm 1000 and may have an upper surface facing a direction of the upper portion 110a of the suspension arm body 110 and a lower surface opposite to the upper surface. Opening of the bush pipes 140 may be disposed to face a horizontal direction of the hybrid suspension arm 1000.

The ball joint pipe 130 and the bush pipes 140 may be formed of metal material.

A bush 400 may be inserted into each of the two bush pipes 140, and the bush 400 may be engaged with a vehicle body with a bolt ant the like.

Figure 5:
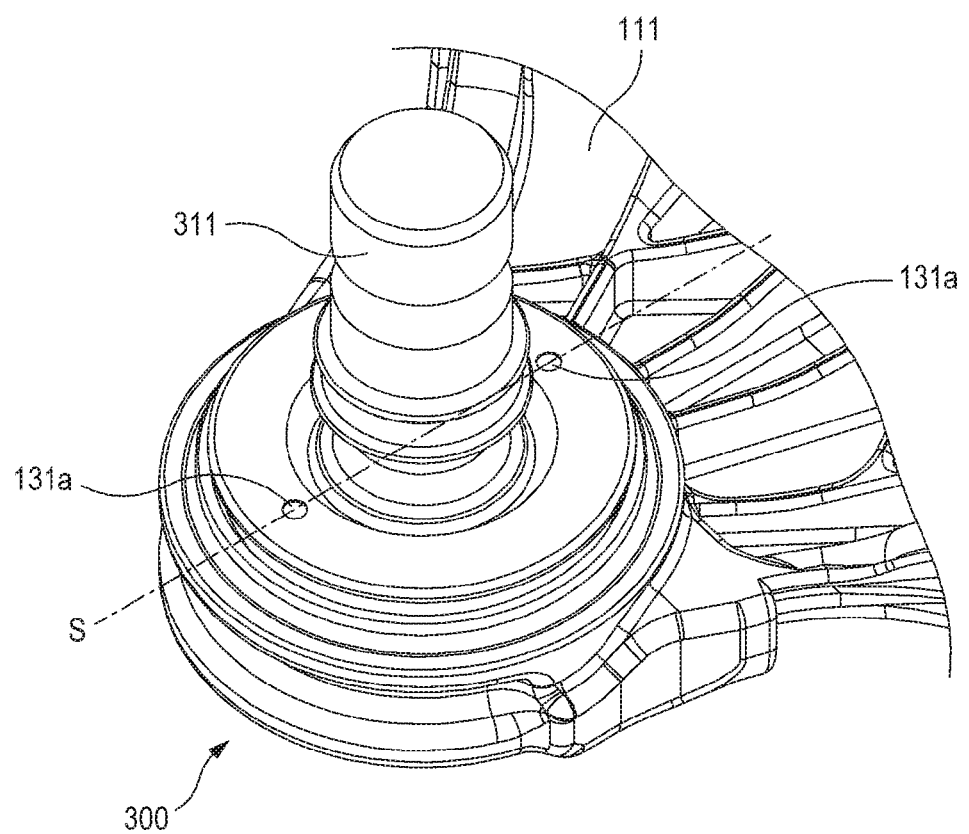
FIG. 5 is an enlarged perspective view illustrating a lower surface side of a ball joint portion of a suspension arm main body according to one embodiment of the present disclosure.

The ball joint 310 may be inserted into and coupled to the ball joint pipe 130. In this case, the ball joint 310 is inserted from the upper portion 110a of the suspension arm body 110. A detailed structure of the ball joint 310 is shown in FIGS. 1 and 5.

The ball joint 310 may comprise a ball stud 311 having a spherical portion 311a and a stick portion 311b, and a bearing 312 surrounding the spherical portion 311a of the ball stud 311 to rotatably support the spherical portion 311a.

A plastic insert molding 200 may be coupled to the suspension arm body 110.

The plastic insert molding 200 may have a shape generally similar to that of the suspension arm body 110. That is, the plastic insert molding 200 may comprise two leg portions 212 and a joint portion 211.

Figure 3:
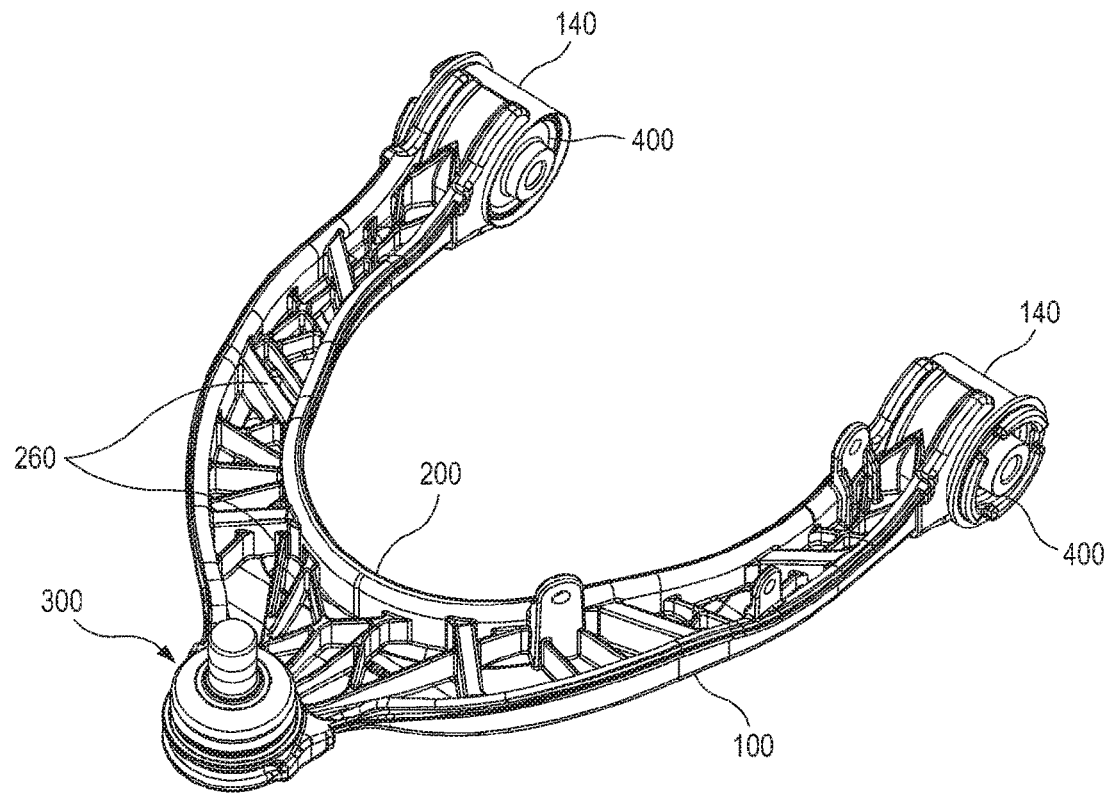
FIG. 3 is a rear side view illustrating the vehicular hybrid suspension arm manufactured by the manufacturing method according to one embodiment of the present disclosure.
Figure 4:
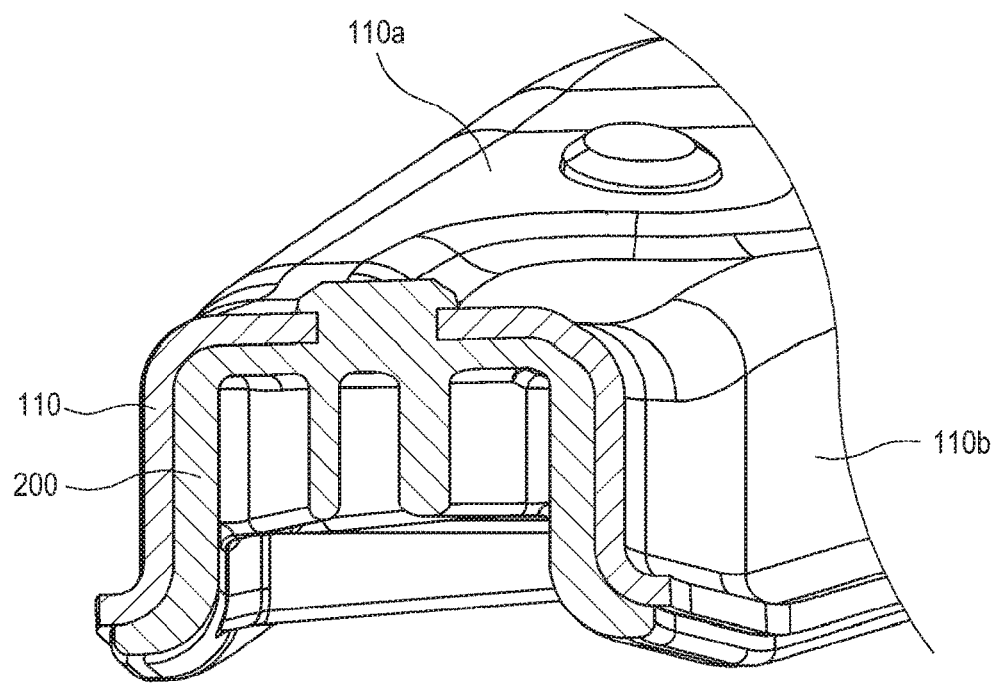
FIG. 4 is a cross-sectional view taken along line A-A of FIG. 1.

FIG. 3 is a rear side view illustrating the vehicular hybrid suspension arm 1000, which is shown in FIG. 1, manufactured by the manufacturing method according to one embodiment of the present disclosure, and FIG. 4 is a cross-sectional view taken along line A-A of FIG. 1.

In one embodiment, reinforcement ribs 260 of a generally grid pattern shape may be integrally formed to protrude from the plastic insert molding 200. The shape of the reinforcement rib 260 may be designed using a computer optimum design program so as to minimize a weight of the plastic insert molding 200.

Referring to FIG. 4, the suspension arm body 110 may comprise the upper portion 110a and the two side portions 110b extending from the upper portion 110a and have a '⊏' shape. Further, an interior of the '⊏' shape may be filled with the plastic insert molding 200.

Figure 6:
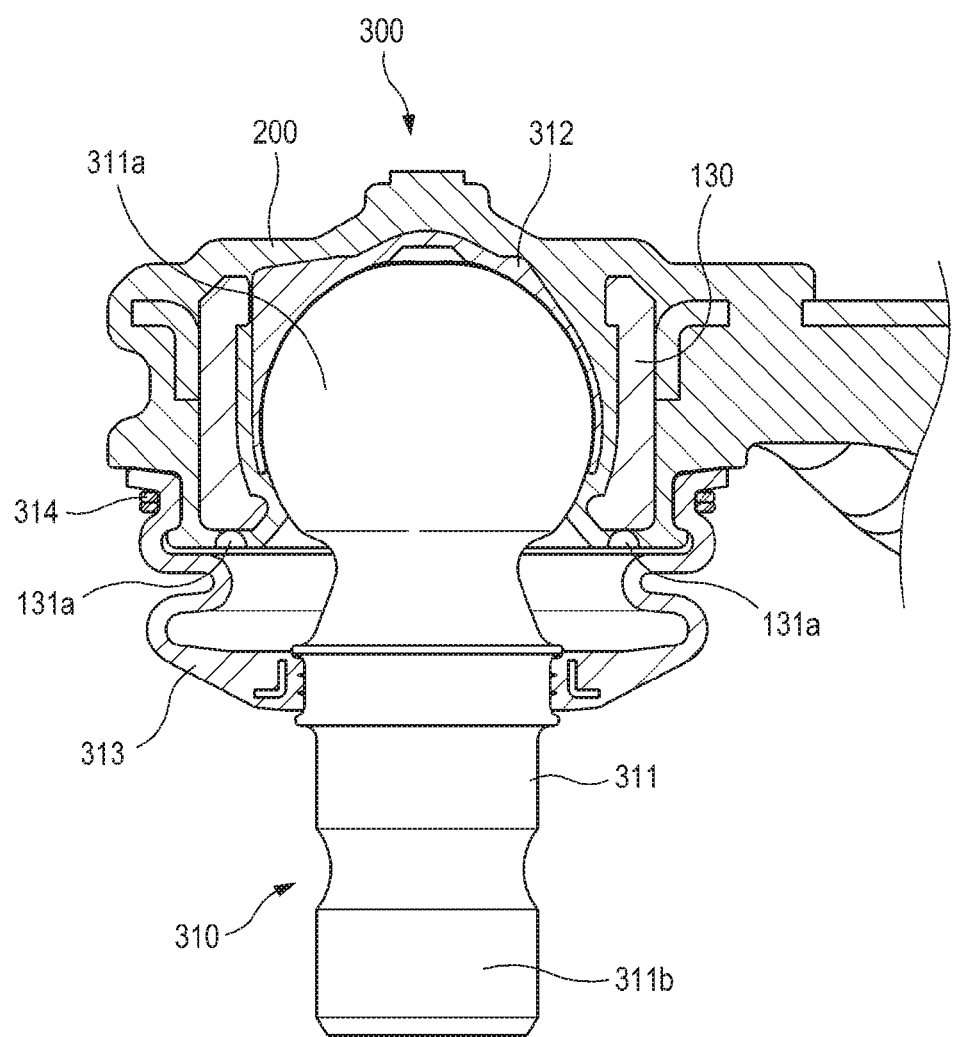
FIG. 6 is a cross-sectional view illustrating the ball joint portion of the vehicular hybrid suspension arm manufactured by the manufacturing method according to one embodiment of the present disclosure.

FIG. 5 is an enlarged perspective view illustrating a lower surface side of the ball joint portion 300 according to one embodiment of the present disclosure, and FIG. 6 is a cross-sectional view of the ball joint portion 300 of the vehicular hybrid suspension arm 1000 according to one embodiment of the present disclosure.

Referring to FIG. 6, the ball joint portion 300 may comprise the ball joint 310 having the ball stud 311 and the bearing 312, a dust cover 313 configured to surround a portion of the stick portion 311b of the ball stud 311 to prevent an inflow of foreign materials, a ring clip 314 configured to couple the dust cover 313 to the ball stud 311, a protector mounted on the ball stud 311 from a direction opposite to the bearing 312, and the ball joint pipe 130. As the plastic insert molding 200 is injected in a direction of an upper surface of the ball joint pipe 130 in a state in which the ball joint 310 is inserted into the ball joint pipe 130, the ball joint 310 may be integrally coupled to the ball joint pipe 130 and the plastic insert molding 200.

Since the plastic insert molding 200 surrounds the bearing 312 while penetrating between the bearing 312 and the ball joint pipe 130, after the plastic insert molding 200 is cured, the bearing 312 may be firmly fixed to the ball joint pipe 130. Fixing pin contact portions 131a may be formed on a lower surface of the ball joint pipe 130. The fixing pin contact portions 131a are a plurality of holes which are not covered with a molding material. The fixing pin contact portions 131a are the portions in contact with fixing pins 131b of a mold in the insert molding injection process for manufacturing the hybrid suspension arm 1000, and this will be described in detail below. The bearing 312 surrounds the spherical portion 311a of the ball stud 311, and the dust cover 313 covers a portion of the stick portion 311b of the ball stud 311 so as to prevent an inflow of foreign materials into the bearing 312. In this case, since the dust cover 313 also covers the fixing pin contact portions 131a, the lower surface of the ball joint pipe 130 (i.e., exposed portion of metal material), which is not covered with the plastic insert molding due to the fixing pin contact portions 131a, is blocked from being in contact with external air or foreign materials.

Figure 7:
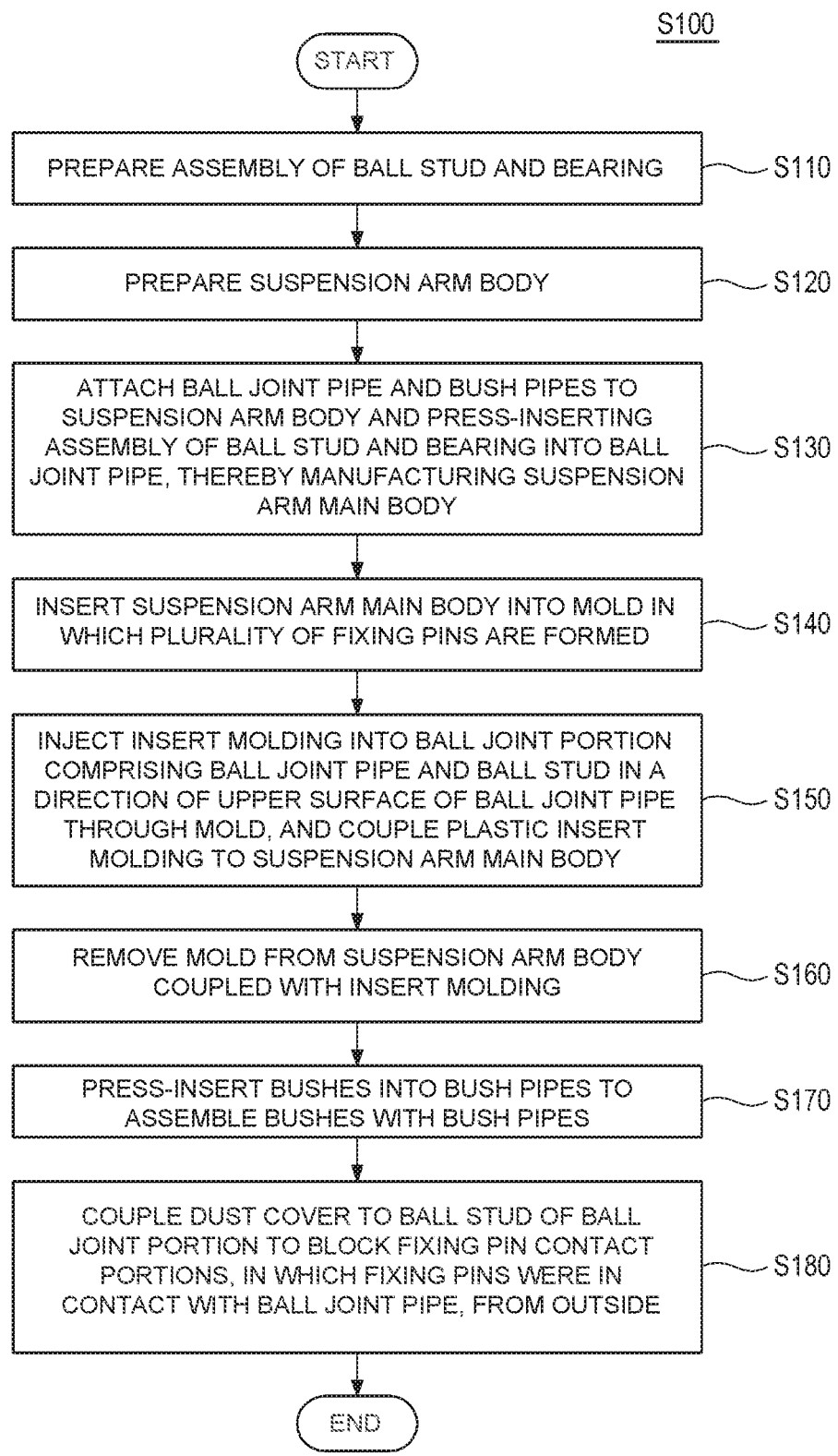
FIG. 7 is a flowchart illustrating a method of manufacturing a vehicular hybrid suspension arm according to one embodiment of the present disclosure.

FIG. 7 is a flowchart illustrating a method (S100) of manufacturing a vehicular hybrid suspension arm 1000 according to one embodiment of the present disclosure. Hereinafter, each operation of the method (S100) of manufacturing a vehicular hybrid suspension arm will be described with reference to the flowchart of FIG. 7.

Referring to FIG. 7, the method (S100) of manufacturing a vehicular hybrid suspension arm according to one embodiment may comprise preparing an assembly of a ball stud and a bearing (S110). In one embodiment of the preparing of the assembly of the ball stud and the bearing (S110), the ball stud may be made of steel material, and the bearing may be made of plastic material.

Next, the method (S100) of manufacturing a vehicular hybrid suspension arm according to one embodiment may comprise preparing a suspension arm body (S120). The suspension arm body may be formed using a steel plate and may be formed of metal material. Further, a painted surface may be formed on a surface of the suspension arm body so as to prevent rust occurrence.

The method (S100) of manufacturing a vehicular hybrid suspension arm according to one embodiment also may comprise attaching a ball joint pipe and bush pipes to the suspension arm body and manufacturing a suspension arm main body by inserting the assembly of the ball stud and the bearing into the ball joint pipe (S130). The ball joint pipe and the bush pipes may be formed of metal material. Further, each of the ball joint pipe and the bush pipes may be formed in a circular shape having an opening. For example, the ball joint pipe and the bush pipes may be respectively coupled to the suspension arm body by a welding, a laser welding, an ultrasonic, and the like. However, the coupling method is not limited to the above method. Next, the method (S100) of manufacturing a vehicular hybrid suspension arm according to one embodiment may comprise inserting the suspension arm main body into a mold in which a plurality of fixing pins are formed (S140). In this case, the plurality of fixing pins may be located adjacent to the ball joint portion 300 to fix a lower surface of the ball joint pipe during injection of an insert molding.

Next, the method (S100) of manufacturing a vehicular hybrid suspension arm according to one embodiment may comprise coupling a plastic insert molding to the suspension arm main body by injecting an insert molding into the ball joint portion 300 comprising the ball joint pipe and the ball stud in a direction of an upper surface of the ball joint pipe through the mold (S150). Further, the method (S100) of manufacturing a vehicular hybrid suspension arm according to one embodiment may comprise separating the assembly of the suspension arm main body and the plastic insert molding from the mold (S160); and inserting and assembling the bushes into the bush pipes (S170), and may further comprise coupling a dust cover to the ball stud of the ball joint portion 300 to block fixing pin contact portions in which the fixing pins were in contact with the ball joint pipe from the outside (S180).

Hereinafter, each operation illustrated in the flowchart of FIG. 7 will be described in more detail with reference to FIGS. 8A to 8D.

Figure 8A:
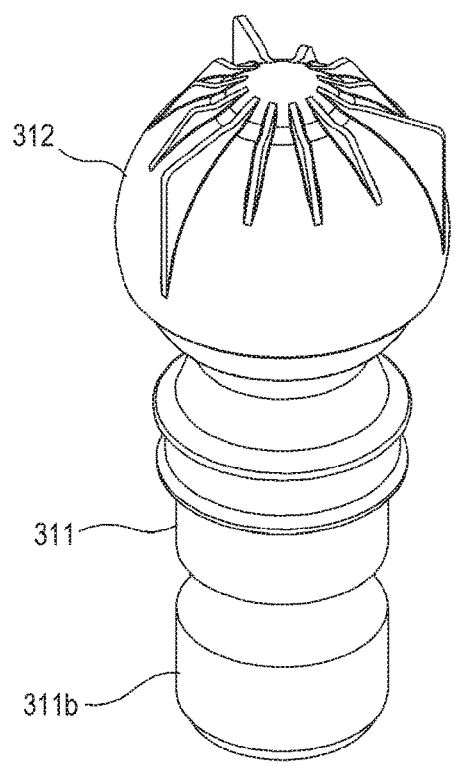
FIG. 8A is a perspective view illustrating an assembly of a ball stud and a bearing.

FIG. 8A is a perspective view illustrating the assembly of the ball stud 311 and the bearing 312.

As illustrated in FIG. 8A, in the preparing of the assembly of the ball stud 311 and the bearing 312, the ball stud 311 and the bearing 312 are manufactured and then the bearing 312 is coupled to and assembled with the ball stud 311. In this case, in order to improve performance of the bearing 312, a lubricant may be injected between the bearing 312 and the ball stud 311.

Figure 8B:
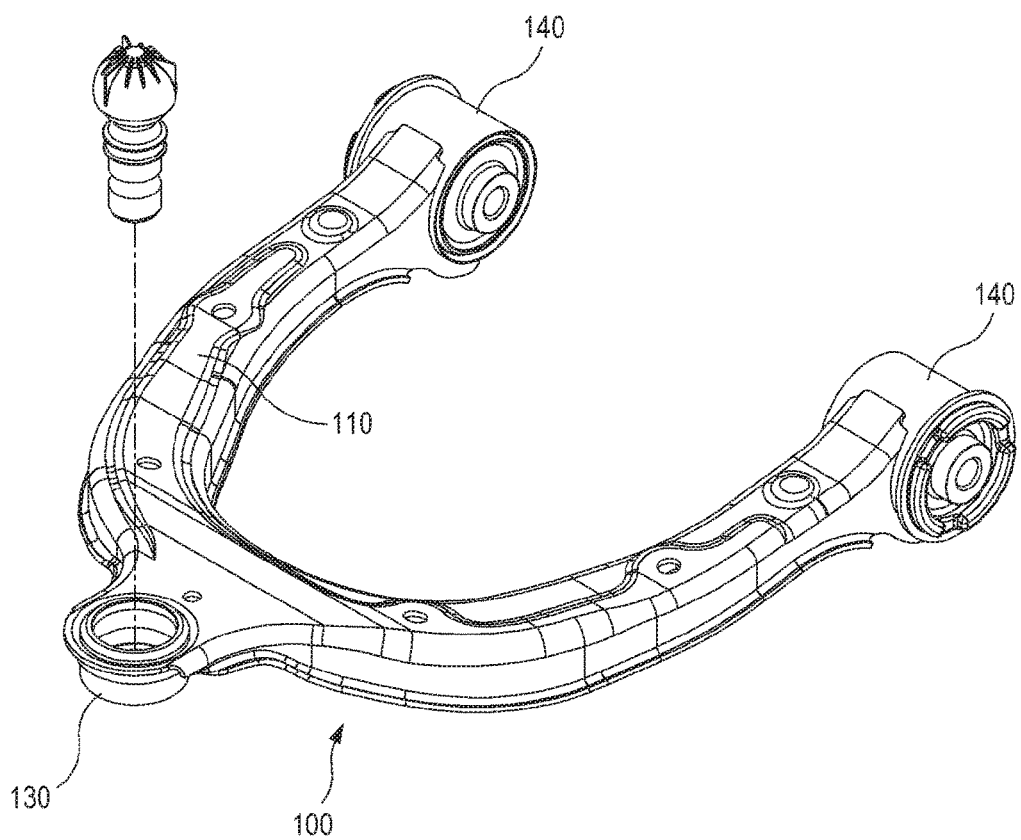
FIG. 8B is an assembled perspective view illustrating an operation of manufacturing a suspension arm main body by inserting a ball joint into a ball joint pipe coupled to a suspension arm body.

FIG. 8B is an assembled perspective view illustrating an operation of manufacturing the suspension arm main body by inserting the ball joint into the ball joint pipe coupled to the suspension arm body.

FIG. 8B illustrates a method of inserting the ball joint 310 into the ball joint pipe 130 so as to manufacture the suspension arm main body. The ball joint 310 is inserted from the stick portion 311b of the ball stud 311 toward the upper surface 100a of the suspension arm body 110.

Figure 8C:
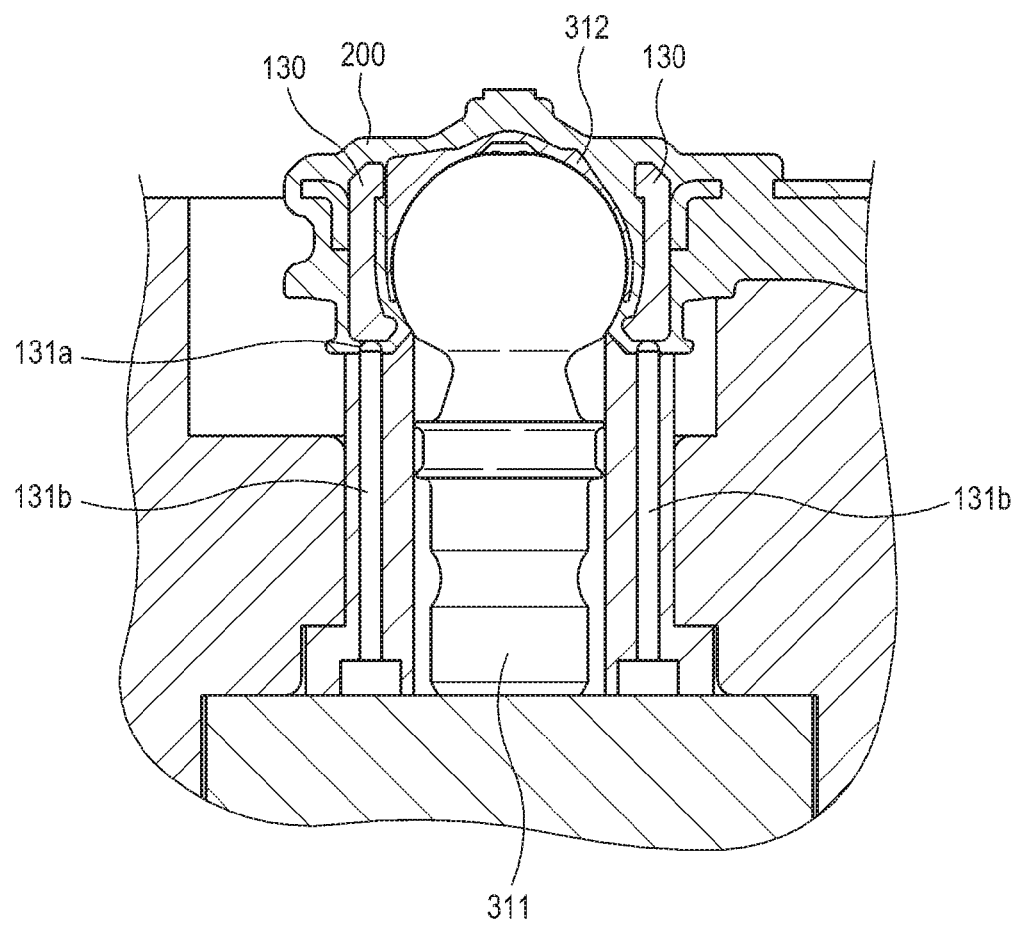
FIG. 8C is a cross-sectional view illustrating a coupling relationship between a mold and a ball joint portion during injection of an insert molding in the method of manufacturing a vehicular hybrid suspension arm according to one embodiment of the present disclosure.

FIG. 8C is a cross-sectional view illustrating a state in which the fixing pins 131b are in contact with the ball joint pipe 130 in the mold. FIG. 8C illustrates a position relationship between the fixing pins 131b and the ball joint pipe 130 in the mold, in the coupling of the plastic insert molding to the suspension arm main body by injecting the insert molding into the ball joint portion 300 comprising the ball joint pipe and the ball stud in the direction of the upper surface of the ball joint pipe through the mold (S150) in the method (S100) of manufacturing a vehicular hybrid suspension arm according to one embodiment.

In this case, the plurality of fixing pins 131b may be formed in the mold, and plastic resin may be injected in a state in which the fixing pins 131b are brought into contact with and support the lower surface of the ball joint pipe 130. The fixing pins 131b formed in the mold may be disposed to be put on the symmetrical line S of the suspension arm body 110.

Further, in this case, an injection hole through which the plastic resin is injected may be formed adjacent to an upper side of the ball joint portion 300 comprising the ball joint 310 and the ball joint pipe 130 in the mold, plastic injection material may be injected in the direction of the upper surface of the ball joint pipe 130, and an injection pressure may be greater than or equal to 300 bar. When the plastic resin is injected, bending deformation may occur in the ball joint portion 300 due to the above injection pressure. This is because a torque of generating the bending deformation in an injection direction acts on the joint portion 111. The fixing pins 131b may be located on a side opposite to a side on which the injection hole is located, may support the ball joint portion 300 while being in contact with the lower surface of the ball joint pipe 130, and may prevent the bending deformation of the ball joint portion due to the injection pressure.

The fixing pins 131b may be formed as two or more fixing pins 131b. When two fixing pins 131b are formed, the fixing pins 131b may be disposed at symmetrical positions based on a center of the ball joint pipe 130 on the symmetrical line S of the suspension arm body 110 so as to effectively offset the torque causing the bending deformation of the ball joint portion 300, may be in contact with the lower surface of the ball joint pipe 130, and may fix the ball joint portion 300.

When three or more fixing pins 131b are formed, the fixing pins 131b may be disposed in a direction extending along the symmetrical line S on the symmetrical line S of the suspension arm body 110 so as to prevent the bending deformation of the ball joint portion 300 as much as possible.

For example, the fixing pins 131b may have a rod shape.

Figure 8D:
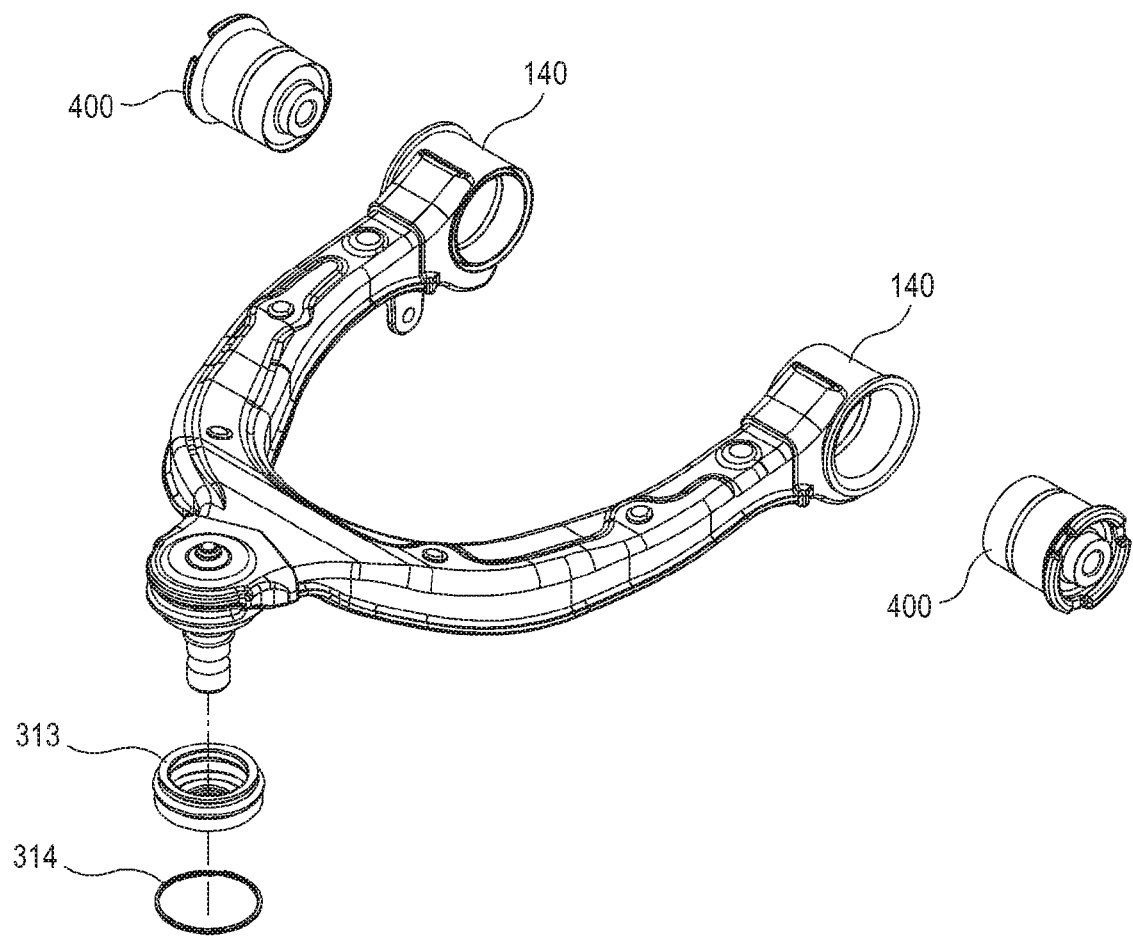
FIG. 8D is an assembled perspective view illustrating an operation of coupling bushed to the suspension arm main body coupled with the insert molding and coupling a dust cover and a ring clip on a stick portion of the ball stud.

FIG. 8D is an assembled perspective view illustrating the coupling of the bushes to the suspension arm main body coupled with the plastic insert molding 200 and the coupling of the dust cover 313 and the ring clip 314 on the stick portion 311b of the ball stud.

The bush 400 may be inserted into and assembled with the bush pipe 140. Next, when the dust cover 313 is mounted on the ball stud 311 and fixed by the ring clip 314, the manufacturing process (S100) of the vehicular hybrid suspension arm 1000 may be terminated. In this case, the dust cover 313 may be coupled to block the fixing pin contact portions 131a formed on the lower surface of the ball joint pipe 130 from the outside. Therefore, even though the plastic injection material is not molded on the fixing pin contact portions 131a, the fixing pin contact portions 131a may be blocked from being in contact with the outside so that there does not occur a problem such as corrosion and the like.

Figure 9:
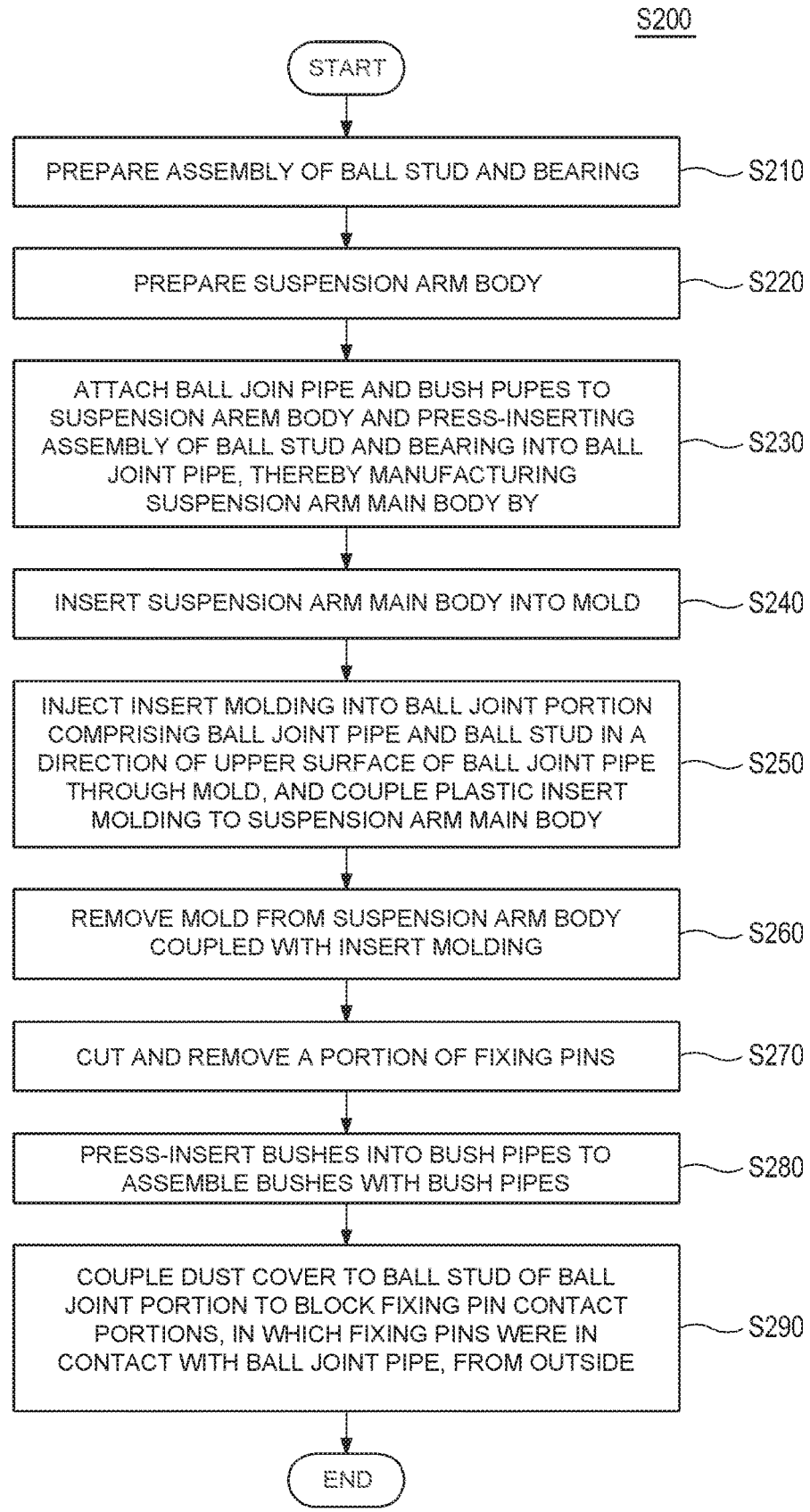
FIG. 9 is a flowchart illustrating a method of manufacturing a vehicular hybrid suspension arm according to one embodiment of the present disclosure.
Figure 10:
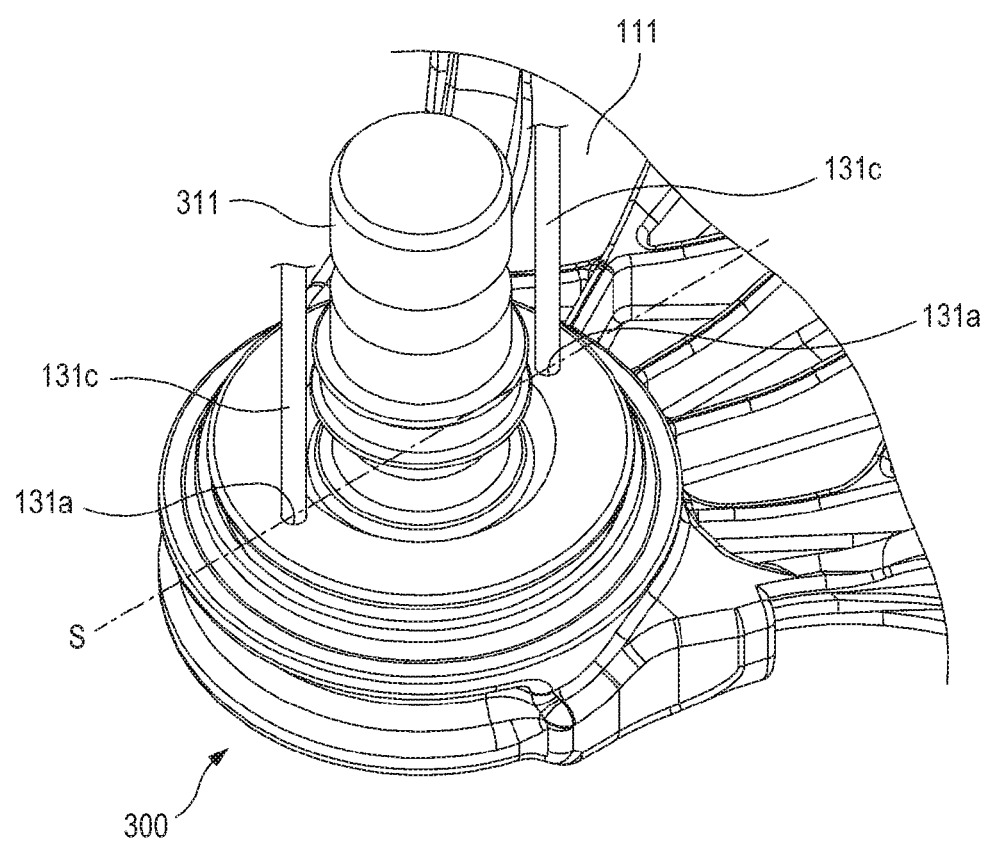
FIG. 10 is an enlarged perspective view illustrating a lower surface side of a ball joint portion of a vehicular hybrid suspension arm according to one embodiment of the present disclosure.

FIG. 9 is a flowchart illustrating a method (S200) of manufacturing a hybrid suspension arm according to another embodiment of the present disclosure, and FIG. 10 is an enlarged diagram illustrating a lower surface side of a ball joint portion 300 of the hybrid suspension arm of FIG. 9.

The method (S200) of manufacturing a hybrid suspension arm of FIG. 9 may be configured with the same operations with the embodiment of FIG. 7 except for cutting and removing a portion of the fixing pins 131c, and thus descriptions of the same operations will be omitted herein.

Referring to FIG. 9, the method (S200) of manufacturing a hybrid suspension arm according to the present embodiment comprises cutting and removing a portion of a fixing pins (S270). In the method of manufacturing a hybrid suspension arm of FIG. 9, the fixing pins 131c are formed on the lower surface of the ball joint pipe 130 and are not formed in the mold.

FIG. 10 illustrates two fixing pins 131c formed on the lower surface of the ball joint pipe 130. In FIG. 9, after the injecting of the insert molding into the ball joint portion 300 comprising the ball joint pipe and the ball stud in the direction of the upper surface of the ball joint pipe through the mold and the coupling of the plastic insert molding to the suspension arm body (S250) is completed, the lower surface of the ball joint portion has a shape in which the fixing pins 131c pass through the plastic insert molding 200 covering the lower surface of the ball joint pipe 130. Therefore, in order to couple the dust cover 313, the portions of the fixing pins 131c, which protrude more than the plastic insert molding 200, are cut and removed (S270). After the fixing pins 131c are cut, the cut cross section is not covered with plastic insert molding 200. However, the cut cross section may be blocked from being in contact with the outside since the dust cover 313 is mounted on the ball stud 311.

As shown in FIG. 10, the fixing pins 131c may be disposed in a direction extending along the symmetrical line S on the symmetrical line S of the suspension arm body 110. As described above, this is to prevent the bending deformation of the ball joint portion 300 by effectively offsetting a torque caused due to an injection pressure during injection of the plastic injection material. Although two fixing pins 131c are shown in FIG. 10, two or more fixing pins 131c may be formed, and the fixing pins 131c are not limited to two fixing pins. When three or more fixing pins 131c are formed, the fixing pins 131b may be disposed in a direction extending along the symmetrical line S on the symmetrical line S of the suspension arm body 110 so as to prevent the bending deformation of the ball joint portion 300 as much as possible. Further, the fixing pin 131c may have a rod shape.

Although the technical spirit of the present disclosure has been described by way of some embodiments and examples shown in the accompanying drawings, it should be noted that various substitutions, modification, and alterations can be devised by those skilled in the art to which the present disclosure pertains without departing from the technical spirit and scope of the present disclosure. Further, it should be construed that these substitutions, modifications, and variations are included within the scope of the appended claims.

What is claimed is:

1. A method of manufacturing a hybrid suspension arm, the method comprising:
    preparing an assembly of a ball stud and a bearing;
    preparing a suspension arm body;
    attaching a ball joint pipe and bush pipes to the suspension arm body;
    manufacturing a suspension arm main body by inserting the assembly of the ball stud and the bearing into the ball joint pipe;
    inserting the suspension arm main body into a mold in which a plurality of fixing pins are formed;
    injecting an insert molding into a ball joint portion comprising the ball joint pipe and the ball stud through the mold and coupling a plastic insert molding to the suspension arm main body; and
    inserting and assembly bushes into the bush pipes,
    wherein when the suspension arm main body is inserted into the mold, the plurality of fixing pins are located adjacent to the ball joint portion to fix a lower surface of the ball joint pipe during injection of the insert molding.

2. The method of claim 1, wherein two fixing pins are formed in the mold.

3. The method of claim 2, wherein, in the inserting of the suspension arm main body into the mold, the plurality of fixing pins are disposed on a symmetrical line of the suspension arm body.

4. The method of claim 1, wherein the suspension arm body is formed of metal material, and anti-corrosion painting is applied to the suspension arm body.

5. The method of claim 1, wherein:
    the mold comprises at least one injection hole formed in a position adjacent to the ball joint portion; and
    in the coupling of the plastic insert molding to the suspension arm body, the insert molding is injected in direction of an upper surface of the ball joint pipe through the at least one injection hole.

6. The method of claim 1, further comprising:
    removing the mold from the suspension arm body coupled with the insert molding; and
    coupling a dust cover to the ball stud of the ball joint portion to block fixing pin contact portions, in which the fixing pins were in contact the ball joint pipe, from the outside.

7. The method of claim 1, wherein, in the coupling of the plastic insert molding to the suspension arm body, the insert molding is injected with an injection pressure that is greater than or equal to 300 bar.

8. A hybrid suspension arm manufactured by the method according to claim 1.

9. A method of manufacturing a hybrid suspension arm, the method comprising:
preparing an assembly of a ball stud and a bearing;
preparing a suspension arm body;
manufacturing a suspension arm main body by attaching bush pipes and a ball joint pipe, in which a plurality of fixing pins are formed on a lower surface thereof, to the suspension arm body and inserting the assembly of the ball stud and the bearing into the ball joint pipe;
inserting the suspension arm main body into a mold;
injecting an insert molding into a ball joint portion comprising the ball joint pipe and the ball stud through the mold and coupling the insert molding to the suspension arm body;
cutting and removing a portion of the fixing pins; and
inserting and assembling bushes into the bush pipes,
wherein, during injection of the insert molding, the fixing pins are in contact with the mold and fix the ball joint portion.

10. The method of claim 9, wherein two fixing pins are formed on the lower surface of the ball joint pipe.

11. The method of claim 9, wherein, in the inserting of the suspension arm main body into the mold, the plurality of fixing pins are disposed on a symmetrical line of the suspension arm body.

12. The method of claim 9, wherein:
the mold comprises at least one injection hole formed in a position adjacent to the ball joint portion; and
in the coupling of the plastic insert molding to the suspension arm body, the insert molding is injected in direction of an upper surface of the ball joint pipe through the at least one injection hole.

13. The method of claim 9, further comprising:
removing the mold from the suspension arm body coupled with the insert molding; and
coupling a dust cover to the ball stud of the ball joint portion to block the cut cross sections of the fixing pins from the outside.

14. The method of claim 9, wherein, in the coupling of the plastic insert molding to the suspension arm body, the insert molding is injected with an injection pressure that is greater than or equal to 300 bar.

15. A hybrid suspension arm manufactured by the method according to claim 9.

* * * * *